Oct. 26, 1954

H. A. BING ET AL 2,692,540

PHOTOGRAPHIC APPARATUS

Filed Oct. 17, 1951

INVENTORS
Herbert A. Bing
and
Albert L. H. Wright
BY
Brown and Mikulka
ATTORNEYS Oct. 26, 1954　　　H. A. BING ET AL　　　2,692,540
PHOTOGRAPHIC APPARATUS
Filed Oct. 17, 1951　　　　　　　　　　　　　　8 Sheets-Sheet 2

FIG. 2

INVENTORS
Herbert A. Bing
and
Albert C. H. Wright
BY Broward Mikulka
ATTORNEYS

FIG. 4

Oct. 26, 1954  H. A. BING ET AL  2,692,540
PHOTOGRAPHIC APPARATUS
Filed Oct. 17, 1951  8 Sheets-Sheet 5

INVENTORS
Herbert A. Bing
and
Albert L. H. Wright
BY Brown and Mikulka
ATTORNEYS Oct. 26, 1954    H. A. BING ET AL    2,692,540
PHOTOGRAPHIC APPARATUS
Filed Oct. 17, 1951    8 Sheets-Sheet 6

FIG. 7    FIG. 8

INVENTORS
Herbert A. Bing
and
Albert L. H. Wright
BY
Brown and Mikulka
ATTORNEYS Oct. 26, 1954

H. A. BING ET AL 2,692,540

PHOTOGRAPHIC APPARATUS

Filed Oct. 17, 1951

INVENTORS
Herbert A. Bing
and
Albert L. H. Wright
BY
Brown and Mikulka
ATTORNEYS Patented Oct. 26, 1954

2,692,540

UNITED STATES PATENT OFFICE 2,692,540

PHOTOGRAPHIC APPARATUS

Herbert A. Bing and Albert L. H. Wright, Wellesley, Mass., assignors to Polaroid Corporation, Cambridge, Mass., a corporation of Delaware Application October 17, 1951, Serial No. 251,788

18 Claims. (Cl. 95—75)

This invention relates to photography and more particularly to photographic apparatus.

An object of the present invention is to provide a photographic device for copying subject matter wherein a photosensitive sheet may be actinically exposed to subject matter with which it is in contact.

Another object of the present invention is to provide a photographic device of the above type wherein said photosensitive sheet may be developed by superposing it on another sheet and by spreading a processing composition between said sheets.

A further object of the present invention is to provide a photographic device of the above type wherein pressure-applying means are provided for superposing said sheets and spreading a processing composition therebetween.

Other objects of the invention are to provide a photographic device of the above type: wherein there are included a first mounting means, a second mounting means, means for constraining movement of said second mounting means into and out of operative juxtaposition with said first mounting means, an easel mounted on said first mounting means for supporting subject matter to be copied, and holding means mounted on said second mounting means for holding a photosensitive sheet in contact with subject matter supported on said easel; wherein there is included a source of illumination and a novel control means for said source that is responsive to pressure exerted between the aforementioned easel and holding means; wherein there is included a control means for applying pressure between the aforementioned easel and the aforementioned holding means when actuated and for relieving said pressure when deactuated, and wherein a pair of pressure-applying members of the above type are a relatively small distance from each other when actuated and a relatively large distance from each other when deactuated, means being provided for controlling the actuation and deactuation of said control means and of said pressure-applying members; wherein first and second mounting means of the above type are adapted to be juxtaposed to form a compact container; wherein the aforementioned first and second mounting means are so constructed and arranged as to permit the insertion of a single page of a book therebetween; and wherein one of a pair of pressure-applying members may be selectively secured either on a first or a second mounting means of the above type.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

By way of introduction, photographic apparatus of the type herein illustrated generally includes means for processing an exposed photosensitive sheet by superposing said photosensitive sheet on another sheet and by spreading a thin layer of processing composition between said sheets. The photosensitive sheet may comprise a silver halide layer. In one form thereof, the second sheet comprises a silver precipitating layer. The processing composition, by way of example, may comprise a developer, a silver halide solvent, an alkali and a viscosity-increasing, film-forming material such as an alkali-inert polymer. In practice, superposition of said sheets with a thin layer of processing composition therebetween may be accomplished by advancing said sheets between a pair of pressure-applying members. The result of this procedure is to develop the latent image on the photosensitive sheet to silver and to form in a frame of the photosensitive sheet a soluble silver complex from unexposed silver halide for transfer to the other sheet. This complex, at least in part, may be transferred by imbibition to a frame of the other sheet where it may be developed to silver to produce a positive image.

The photographic process and various species of photosensitive and other sheets herein referred to are described in detail in Patent No. 2,543,181, issued to Edwin H. Land on February 27, 1951, for Photographic Product Comprising a Rupturable Container Carrying a Photographic Processing Liquid and in application Serial No. 7,795, filed by Edwin H. Land on February 12, 1948, for Photographic Process, now Patent No. 2,647,056, issued July 28, 1953. It is, of course, to be understood that the apparatus herein described is not limited to use with any particular species of photosensitive or other sheets, the terms "photosensitive sheet" and "other sheet" being used in their broadest sense to indicate a first sheet which is photosensitive and a second sheet which merely may aid in spreading the processing liquid over the surface of the photosensitive sheet or which may, if desired, possess other characteristics.

The embodiment of the present invention illustrated in the accompanying drawings is in the form of a copying device. In the form thereof as shown, the copying device comprises a base and a cover pivotally attached to said base. The base and cover have side walls which are adapted to be aligned and juxtaposed to form a substantially lighttight photographic housing. An easel for supporting subject matter to be copied is mounted on the base for movement inwardly and outwardly with respect to the base. Resilient means are provided to urge the easel to a predetermined outward position with respect to the base. A holding means, for holding a photosensitive sheet in contact with subject matter supported on the easel, acts to exert pressure to force the easel inwardly from said predetermined outward position when the base and cover are aligned and juxtaposed. Mounted on the cover is a source of illumination by means of which a photosensitive sheet in contact with subject matter on the easel may be exposed. When subject matter is positioned on the easel and a photosensitive sheet is being held in contact with the subject matter, light emanating from the source of illumination is directed through the photosensitive sheet to the subject matter and is differentially absorbed by the dark and light portions of the subject matter. Since the light portions reflect a greater amount of light back to the photosensitive sheet than do the dark portions, areas of the photosensitive sheet adjacent light portions of the subject matter are exposed to a greater degree than are areas of the photosensitive sheet adjacent dark portions.

The copying device further includes a pair of pressure-applying members which, when actuated, are adapted to superpose the photosensitive sheet on another sheet and to spread a thin layer of processing composition between said sheets. The photosensitive sheet and other sheet are so connected that the photosensitive sheet may be positioned on subject matter supported on the easel without interference from the other sheet and, after exposure, may be drawn from the easel and between pressure-applying members in superposition with the other sheet. A portion of the photosensitive sheet forms a leader which is adapted to be grasped by an operator. When the pressure-applying members are inoperative, they are spaced a comparatively large distance apart so that the leader may be extended readily therebetween. Manual means are provided to render the pressure-applying members operative. This manual means further acts to relieve the pressure exerted between the holding means and the easel in order to permit a photosensitive sheet in contact with subject matter supported on the easel to be drawn from contact with said subject matter. Automatic means are provided to return the pressure-applying members to inoperative condition and to restore the pressure exerted between the holding means and the easel in order to enable re-use of the copying device.

Figure 1:
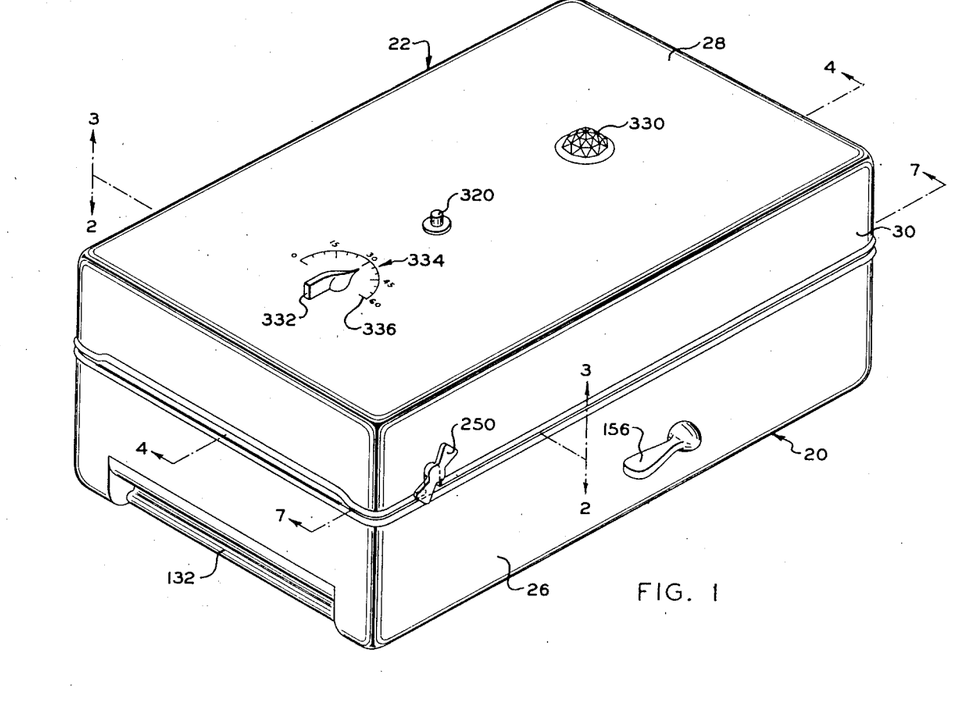
Figure 1 is a perspective view of a copying device embodying the present invention.
Figure 2:
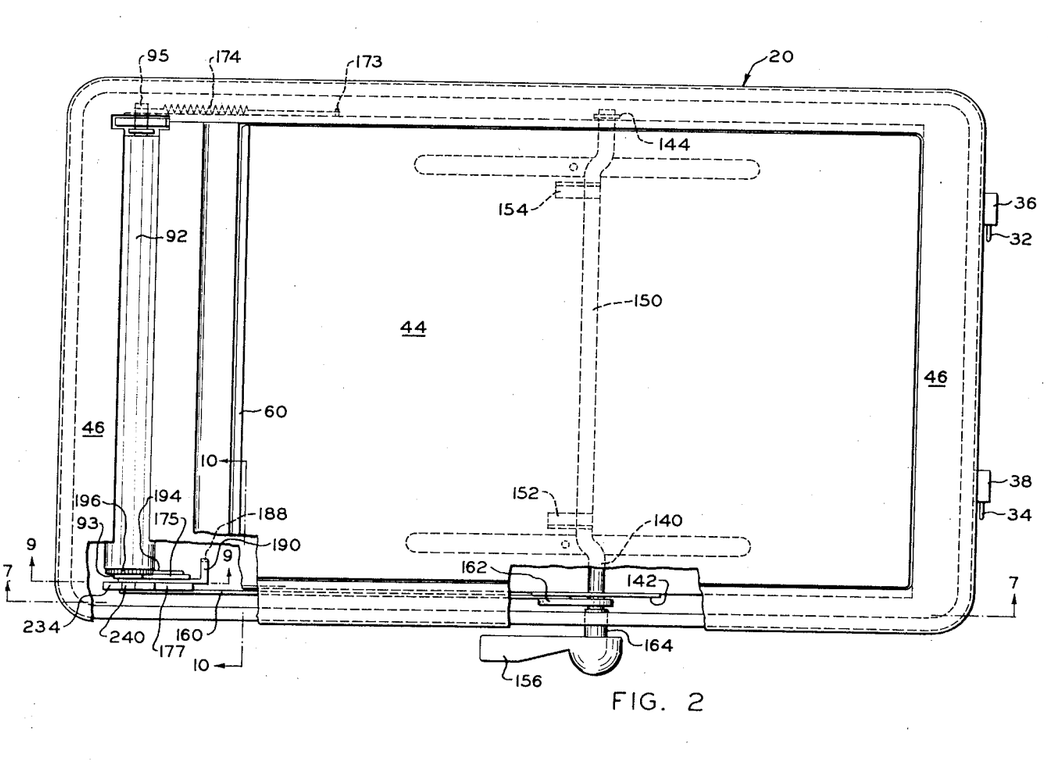
Fig. 2 is a partially broken-away, top plan view of the base of the copying device, taken substantially along the line 2—2 of Fig. 1.
Figure 3:
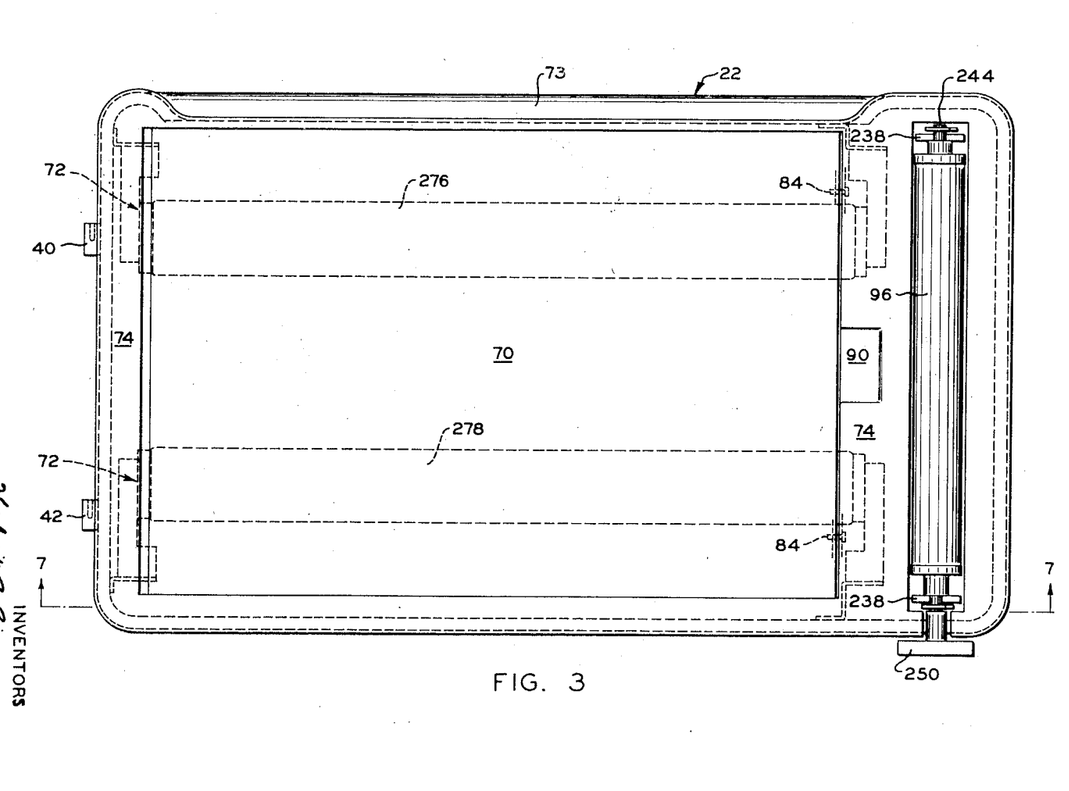
Fig. 3 is a bottom plan view of the cover of the copying device, taken substantially along the line 3—3 of Fig. 1.

In accordance with the present invention, means are provided for mounting the various elements of the illustrated embodiment. As shown, this means comprises a lower mounting means or base 20 and an upper mounting means or cover 22. Base 20 includes a bottom wall 24 (Fig. 4) and a side wall 26 (Fig. 1) extending along the edges of bottom wall 24. Cover member 22 (Fig. 1) includes a top wall 28 and a side wall 30 extending along the edges of top wall 28. When the free edges of side walls 26 and 30 are aligned and juxtaposed, the compact container shown in Fig. 1 is formed. This container is adapted to prevent light and dust from reaching elements positioned therewithin. In order to facilitate alignment and juxtaposition of the free edges of side walls 26 and 30, means for constraining the movement of cover 22 into and out of juxtaposition with base 20 are provided. The constraining means, as illustrated, is a pivot which includes the stub shafts 32 and 34 (Fig. 2) that are integrally mounted on the shoulders 36 and 38, respectively, and the bushings 40 and 42 (Fig. 3). Shoulders 36 and 38 are affixed to side wall 26 of base 20. Bushings 40 and 42 are affixed to side wall 30 of cover 22. Stub shafts 32 and 34 are removably insertable and rotatable in bushings 40 and 42, respectively.

In the illustrated embodiment, an easel 44 is provided to furnish support for subject matter that it is desired to copy. As shown, easel 44 is mounted on base 20 for movement inwardly and outwardly with respect to base 20 in a manner now to be described. Suitably connected to the free edges of side wall 26 is a frame 46. Viewing Fig. 2, the inner edges of the upper, lower and right hand portions of frame 46 are provided with integral downturned flanges 48, flanges 48 being most advantageously shown in Figs. 4 and 5. Cooperating with flanges 48 is a flange 49, flange 49 being integral with a member 50, the structure and function of which will be later described. Flanges 48 and 49 act as guides for easel 44.

Easel 44 is outwardly urged with respect to base 20 by suitable resilient means, such as a pair of leaf springs 52, the central portions of which are secured to member 50, as at 51, and the ends of which abut against the lower surface of easel 44. Such means as the stops 56 act to limit outward movement of easel 44, one stop being positioned adjacent each corner of easel 44. Each stop is suitably attached to easel 44, as at 57, and includes a horizontally projecting element 58 that is adapted to abut against the lower edge of a flange 48. One such lower edge is designated by numeral 59 in Fig. 4.

As a means for positioning subject matter on easel 44 for exposure, an L-shaped sheet metal member 60 (Fig. 4) is provided, the vertical portion of which is suitably attached to an edge of easel 44 and the horizontal portion of which extends over the upper surface of easel 44. Member 60 acts to prevent dislocation of subject matter which is supported by easel 44 and an end of which has been inserted between easel 44 and the horizontal arm of member 60.

In accordance with the present invention, a means for clamping or otherwise holding a photosensitive sheet in intimate contact with subject matter positioned on easel 44 is provided. In the form thereof as shown, this means includes a plastic transparent bag or sac 70 that is mounted on cover 22. In order to expose a photosensitive sheet to subject matter with which it is in contact, an illumination means 72 (Fig. 4) is provided which, in the illustrated embodiment, is adapted to radiate actinic light through sac 70 to said photosensitive sheet and subject matter. Sac 70 may be gas or liquid filled and may comprise walls that are composed of any suitable transparent or translucent flexible material. Sac 70 may be provided with a normally flat lower pressure face 71 which is adapted to conform to the contour of the surface of subject matter against which it is being pressed and thus to hold a photosensitive sheet in intimate contact with this surface.

It is expressly to be understood that means other than sac 70 may be advantageously employed to hold a photosensitive sheet in contact with subject matter supported on easel 44. For example, a netting of transparent or translucent plastic may be substituted for plastic sac 70. Alternatively, a sheet of transparent or translucent material may be suitably mounted on cover 22 and may coact with a resilient layer mounted on easel 44. Such a resilient layer may be composed of sponge rubber, felt, etc.

It will be noted that side wall 30 of cover 22 is slanted inwardly, as at 73 (Figs. 3 and 5), side wall 30 being slightly separated from side wall 26 in this region when the free edges of side walls 26 and 30 are aligned and juxtaposed. This construction permits insertion of a single page of a bound volume between easel 44 and sac 70 without appreciably interfering with normal alignment and juxtaposition of side walls 26 and 30.

In the illustrated embodiment, means are provided for mounting sac 70, which means comprise a frame 74 (Fig. 3) suitably connected to the free edges of side wall 30 and having the inner edges of the left-hand and right-hand portions thereof, as viewed in Fig. 3, provided with integral upturned flanges 76. The inner edges of the upper and lower portions of frame 74 are provided with integral upturned flanges 77. Flanges 76 and 77 are most advantageously shown in Figs. 4, 5 and 7. A support 78, which is mounted within frame 74, carries sac 70. The rolled flanges 80 of support 78 and such means as the transparent or translucent, glass or plastic plate 82 are adapted to grasp the edges of sac 70 and thus to fasten sac 70 to support 78. The edges of plate 82 may be tightly held against flanges 80 by such means as the clamps 83 that may be suitably secured to support 78.

Figure 4:
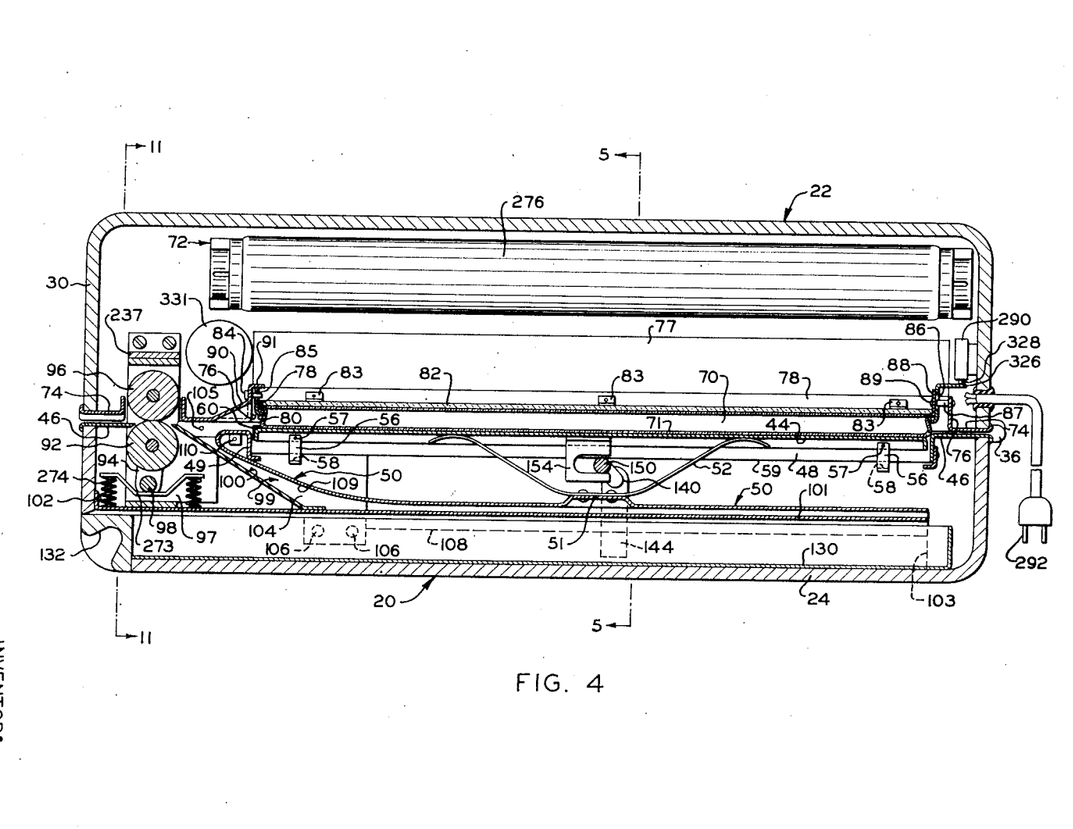
Fig. 4 is a sectional view of Fig. 1, taken substantially along the line 4—4 and showing a pair of pressure-applying members for superposing a photosensitive sheet on another sheet and for spreading a processing composition between said sheets.
Figure 5:
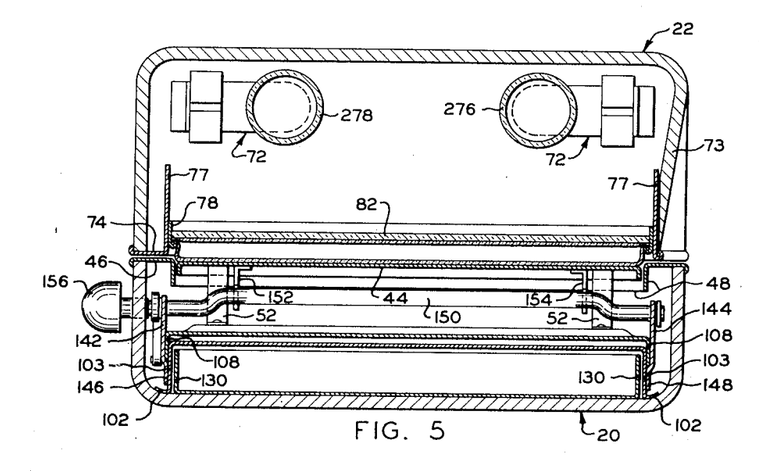
Fig. 5 is a sectional view, taken substantially along the line 5—5 of Fig. 4.

As indicated above, illumination means 72 is adapted to expose a photosensitive sheet to subject matter which is supported on easel 44 and against which said sheet is being pressed by sac 70. Preferably, automatic means are provided for deenergizing illumination means 72 when the pressure exerted between sac 70 and easel 44 has been relieved. This automatic means, in the form thereof as shown, comprises a switch, later to be described in detail, which is controlled by slight movement of support 78 inwardly and outwardly with respect to cover 22. The means by which support 78 is movably mounted in frame 74, as shown, includes the two pins 84 which are fixed to left-hand flange 76, one pin being positioned adjacent each end of said flange. Pins 84 are shown in Figs. 3 and 4. Each pin 84 is provided with a shank portion which extends normally through an aperture 85 in frame 78 and which is smaller in diameter than aperture 85. Support 78 further is provided with an aperture 86, which, viewing Fig. 4, is in the central portion of the right-hand end of support 78. A pin 87 is mounted in the central portion of right-hand flange 76, pin 87 being provided with a shank portion that extends normally into aperture 86. The shank portion of pin 87 is smaller in diameter than is aperture 86. Since apertures 85 and 86 are greater in diameter than are pins 84 and 87, respectively, slight movement of support 78 inwardly and outwardly with respect to cover 22 is permitted.

The means by which support 78 is movably mounted in frame 74, as shown, additionally permits detachment of support 78 from cover 22 in order to provide an operator with access to illumination means 72. Viewing Fig. 4, movement of support 78 to the right, with respect to cover 22, is normally prevented by a leaf spring 88. One end of leaf spring 88 is suitably attached to support 78 adjacent aperture 86 as at 89. The other end of each leaf spring is free and covers aperture 86. An operator, by urging support 78 to the right, may force pin 87 through aperture 86 against the loading of leaf spring 88 and to disengage pins 84 from apertures 85. In this manner, first the left end and then the right end of support 78 may be disengaged from cover 22. When support 78 thus is disengaged from cover 22, illumination means 72 may be repaired, if necessary. In order to enable an operator easily to urge support 78 to the right, a portion 90 of frame 74 is struck up midway between the ends of left-hand flange 76 to provide the finger of an operator with access to the left side of support 78. A free extremity 91 of portion 90 extends horizontally to limit inward movement of the left end of support 78.

Figure 11:
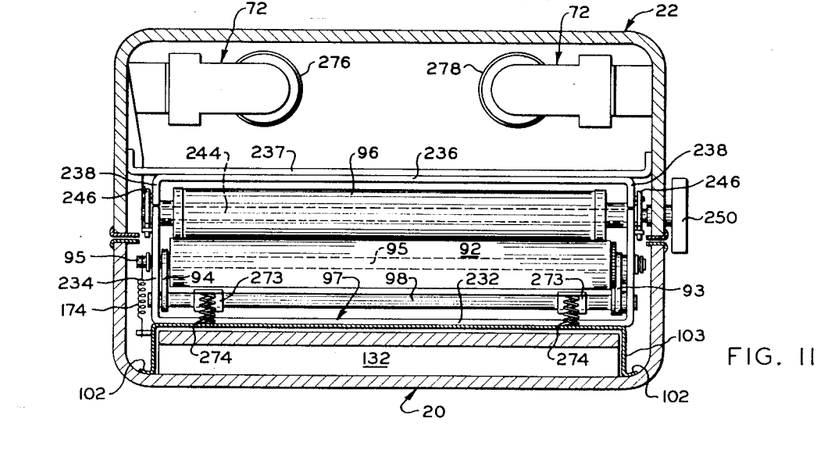
Fig. 11 is a sectional view, taken substantially along the line 11—11 of Fig. 4.

In accordance with the present invention, pressure-applying means are provided for processing an exposed photosensitive sheet by superposing said sheet on another sheet and by spreading a processing composition between said sheets. In the form shown, the pressure-applying means comprise a lower roller 92 and an upper roller 96. Lower roller 92 is rotatably mounted on the links 93 and 94 by means of a shaft 95 (Figs. 4 and 11). Links 93 and 94, in turn, are pivotally mounted on the upstanding legs of a U-shaped mounting member 97 by means of an axle 98. Links 93 and 94 are keyed or otherwise secured to axle 98 so that they pivot in unison through an arc about axle 98. The upstanding legs of member 97 are provided with arcuate slots 157 in which the ends of shaft 95 are adapted to ride. The ends of slots 157 provide stops which limit pivotal movement of roller 92. Upper roller 96 is adapted to be rotatably mounted on the free ends of the legs of member 97. When upper roller 96 is so mounted, lower roller 92 may be pivoted from an operative position adjacent upper roller 96 to an inoperative position spaced an appreciable distance from upper roller 96. When upper roller 96 is mounted on the legs of member 97 and lower roller 92 is in operative position, a pressure-applying means is formed which is adjacent easel 44 and which is adapted to receive a photosensitive sheet directly from contact with subject matter on easel 44.

Figure 7:
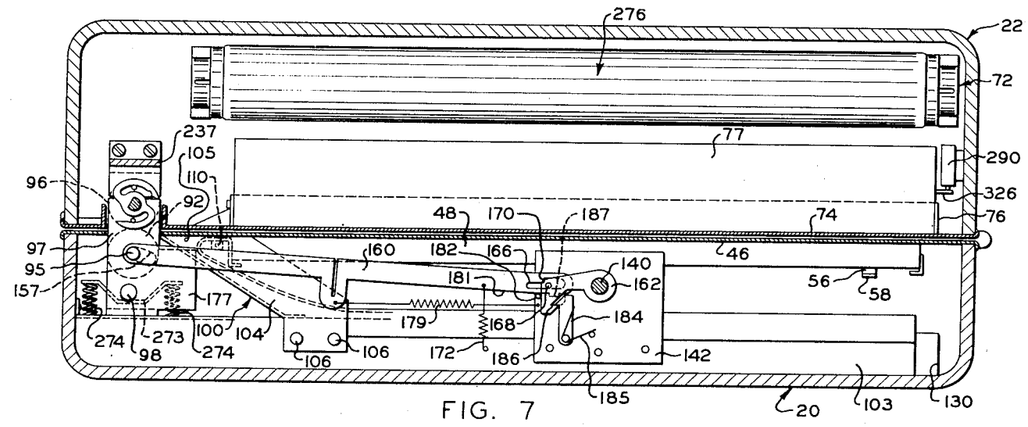
Fig. 7 is a sectional view, taken substantially along the lines 7—7 of Figs. 1, 2 and 3 and showing a linkage in one of its positions, said linkage serving to interconnect operative components.

When a photosensitive sheet is advanced between rollers 92 and 96 directly from contact with subject matter on easel 44, in order that development occur, it is desired that another sheet be advanced in superposition therewith. In the illustrated embodiment, base 20 is provided with a passage 99 (Fig. 4) for temporarily receiving the other sheet during exposure of the photosensitive sheet to subject matter on easel 44. As shown, the base of passage 99 is defined by a guide 100 and a floor 101 (Fig. 4). Floor 101 is attached to side wall 26, as at 102, and is provided with a pair of downturned flanges 103 (Fig. 5), the lower edges 102 of which are suitably attached to base 20. Guide 100 is provided at its opposite ends with arms 104 (Figs. 4 and 7). The upper portions of arms 104 are attached, as at 105, to downturned flanges 48 of frame 46. The lower portions of arms 104 are attached, as at 106, to downturned flanges 103 of floor 101.

Member 50 forms the ceiling of passage 99 and is provided with a pair of downturned flanges 108 (Fig. 5) which are suitably attached to flanges 103 of floor 101. An upwardly extending portion 109 (Fig. 4) of member 50 is attached, as at 110 (Figs. 4 and 7), to arms 104 of guide 100. The mouth of passage 99 is positioned to enable advancement of the other sheet between rollers 92 and 96 directly from passage 99 simultaneously with advancement of the photosensitive sheet between the rollers directly from contact with subject matter on easel 44.

Figure 6:
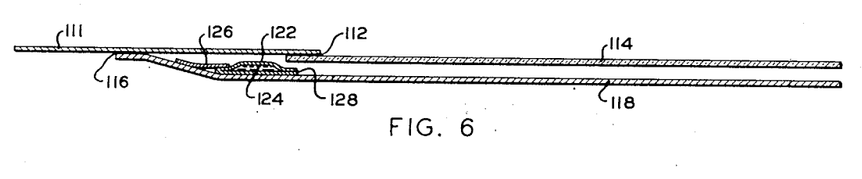
Fig. 6 is a longitudinal sectional view of a film package that is adapted to be used with the device of Fig. 1, the section being taken substantially midway between the longitudinal edges thereof.

A cross-sectional view of a package of a photosensitive sheet and another sheet that may be used in conjunction with the illustrated copying device is shown in Fig. 6. The package comprises a leader 111 of conventional leader stock. Suitably attached, as by means of a heat seal 112, to an end of leader 111, is a photosensitive sheet 114 which may comprise a layer of silver halide emulsion. Suitably attached, as by means of a heat seal 116 to an intermediate portion of leader 111 is another sheet 118 which may comprise a print-receiving layer. A pod 122 is provided for carrying a supply of a processing composition 124. Pod 122 is secured as by means of a tape 126 to sheet 118. A mouth 128 of pod 122 which is normally sealed by means of a suitable adhesive is positioned adjacent the leading edge of sheet 114. When sheet 114 is in contact with subject matter on easel 44, sheet 118 may be inserted in passage 99 and leader 111 may be extended between rollers 92 and 96. After exposure of sheet 114, leader 111 may be grasped by an operator and sheets 114 and 118 may be drawn between rollers 92 and 96. When pod 122 passes between rollers 92 and 96, mouth 128 is ruptured and processing composition 124 is released. As the passage of sheets 114 and 118 between rollers 92 and 96 continues, processing composition 124 is spread between the sheets in a uniformly thin layer. Tape 126, in addition to securing pod 122 to second sheet 118, serves as a spacing member which gradually increases the total thickness of the leader end of the package to the thickness of the package in the vicinity of pod 122. In this manner, when the package is being drawn between rollers 92 and 96, a sudden increase in the pull required on leader 111 by reason of the thickness of pod 122 is avoided.

Such means as a drawer 130 (Figs. 4 and 5), which normally is positioned within base 20, may be provided for the storage of packages or other supplies usable with the illustrated device. Drawer 130 may be provided with a suitable handle 132.

In the illustrated embodiment, means are provided for relieving the pressure exerted between easel 44 and sac 70 by moving easel 44 inwardly with respect to base 20. By virtue of this means, a photosensitive sheet, which has been held in contact with subject matter on easel 44 during exposure, may be drawn from contact with the subject matter after exposure. As shown, this means comprises a shaft 140 (Figs. 2 and 4) having a crank portion 150. Shaft 140 is trunnioned on a pair of brackets 142 and 144 which may be secured, as at 146 and 148, respectively, to floor 101. A pair of guide tracks 152, which are suitably attached to the lower surface of platform 44, movably receive crank portion 150. Such means as a manual operating handle 156 (Fig. 2) is affixed to shaft 140 to enable counterclockwise (viewing Fig. 4) rotation of shaft 140. By reason of the constraint provided by flanges 48 and 49, shaft 140, when rotated in a counterclockwise direction, acts through crank portion 150 and guide tracks 152 to force easel 44 inwardly with respect to base 20.

Figure 8:
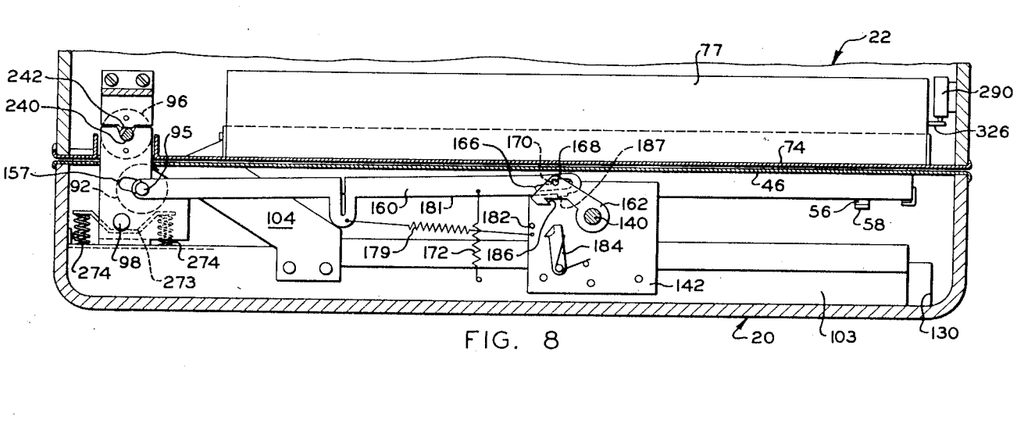
Fig. 8 is a fragmentary sectional view similar to that shown in Fig. 7 and showing the aforementioned linkage in another of its positions.

Preferably, means for interconnecting the movement of easel 44 with the positioning of lower roller 92 is provided. As shown, the interconnecting means comprises a tie link 160 (Figs. 7 and 12), one end of which is pivoted to shaft 95. A drive arm 162, secured to shaft 140 by such means as a collar 164 (Fig. 2) is operatively connected to the other end of tie link 160 in the following manner. Tie link 160 is provided with a slot 166 having a pressure surface 170. Affixed to drive arm 162 is a pin 168 which extends into slot 166. Viewing Fig. 8, when roller 92 is inoperative or, otherwise stated, is pivoted to its extreme clockwise position, tie link 160 is in its extreme right-hand position. When tie link 160 is in this position, pin 168 is adapted to abut against pressure surface 170 of slot 166. The right-hand end of tie link 160 is drawn downwardly by such means for example as a spring 172, one end of which is connected to tie link 160 and the other end of which is secured to flange 103 of floor 101. Since springs 52, acting against easel 44, urge shaft 140 and therefore drive arm 162 in a clockwise direction, pin 168 is urged constantly against the upper edge of slot 166. Depression of operating handle 156 which, as seen above, causes inward movement of easel 44 with respect to base 20, further causes counterclockwise rotation of drive arm 162. When drive arm 162 thus is rotated, pin 168 abuts against pressure surface 170 to urge tie link 160 to the left and to urge lower roller 92 into its operative or, otherwise stated, extreme counterclockwise position.

In the present embodiment, the springs 174 and 179 form part of an automatic means for returning roller 92 to its inoperative position. Viewing Fig. 2, one end of spring 174 is suitably attached, as at 173, to flange 103 of floor 101 and the other end is secured to the upper end of shaft 95. Viewing Fig. 7, spring 179 is attached at one end to tie link 160 and at its other end to bracket 142.

Figure 9:
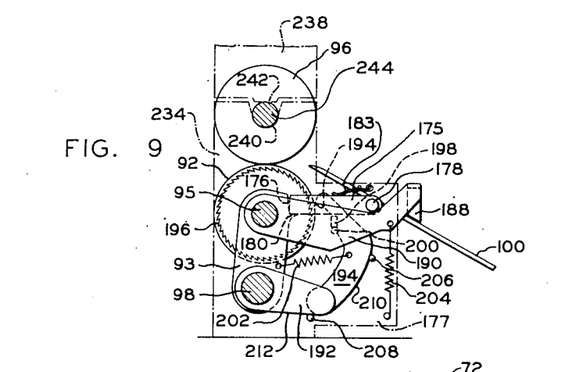
Fig. 9 is a detail view of a component of the copying device, taken substantially along the line 9—9 of Fig. 2.
Figure 10:
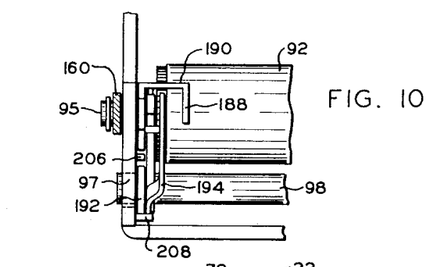
Fig. 10 is another view of the component of Fig. 9, taken substantially along the line 10—10 of Fig. 2.

Means are provided for latching roller 92 in operative position against the action of springs 174 and 179. In the form thereof as shown, this means comprises a locking link 175 (Fig. 9) which is adapted to abut against an edge 176 of link 93. As illustrated, one of the upstanding legs of U-shaped member 97 is provided with an extension 177. Link 175 is pivotally mounted on extension 177 by means of a pin 178 and is urged into contact with edge 176 by such means as a leaf spring 183 (Fig. 9) suitably affixed to extension 177. Integral with edge 176 of link 93, there is provided a lug 180 for limiting counterclockwise rotation of link 175.

Preferably, easel 44 may be latched in its extreme inward position with respect to base 20 when roller 92 is in operative position. Viewing Fig. 7, suitably attached to bracket 142 is a pin or other stop means 182 which, when in contact with an edge 181 of tie link 160, is adapted to limit clockwise rotation of link 160. When handle 156 is being depressed, after edge 181 has abutted against stop means 182, drive arm 162 continues to rotate in a clockwise direction until drive pin 168 is disengaged from surface 170 of slot 166. At this point, drive arm 162 may be latched in position by suitable means. As illustrated, the latch means comprises a pawl 184, pivotally mounted on bracket 142, and an associated leaf spring 185, also mounted on bracket 142. Drive arm 162 is provided with a notch 186 that is adapted to engage pawl 186.

In accordance with the present invention, automatic means are provided for readying the copying device for re-use by returning roller 92 to its inoperative position and by restoring the exertion of pressure between easel 44 and sac 70. Viewing Fig. 7, when drive arm 162 is latched in its extreme counterclockwise position, pin 168 is disengaged from surface 170 of slot 166. Consequently, only the engagement of link 175 (Fig. 9) with edge 176 of link 93 prevents clockwise rotation of links 93 and 94 under the loading of springs 174 (Fig. 2) and 179. The automatic means, as shown, comprises a feeler 188 which normally rides along the edge of sheet 114 which has been positioned in passage 99. When sheet 114 has been advanced almost entirely out of passage 99, feeler 188 drops past the trailing end of the sheet and actuates the automatic means. A feeler arm 190, which is pivotally mounted on shaft 95, mounts feeler 188. A link 192, one end of which is pivoted to axle 98, at its other end pivotally mounts a pawl 194. Affixed to an end of roller 92 and rotatable therewith is a ratchet 196 which is adapted to coact with pawl 194, such means as a spring 202 being provided to urge pawl 194 and ratchet 196 into engagement. Affixed to pawl 194 is a lug 198. A pin 200, which is affixed to feeler arm 190, is adapted to abut against lug 198. When feeler 188 is in contact with a sheet 114 that is positioned in passage 99, pin 200 abuts against lug 198 to keep pawl 194 out of engagement with ratchet 196. When feeler 188 is not in contact with such a sheet 114, pin 200 is drawn out of abutment with lug 198 by such means as a spring 204. When feeler 188 drops past the trailing end of a sheet 114 being drawn from passage 99, the engagement of pawl 194 with ratchet means 196 results. If rollers 92 and 96 are operative, advancement of sheets therebetween causes rotation of said rollers. Thus, advancement of the trailing edge of sheet 114 between rollers 92 and 96 causes rotation of the rollers and rotation of ratchet 196. As a result of the above sequence of operations, ratchet 196 is drawn upwardly and lug 198 lifts locking link 175 from engagement with edge 176, whereupon clockwise rotation of links 93 and 94 is caused by springs 174 and 179. Suitable constraining means, such as follower pins 206 and 208 and cam surfaces 210 and 212, are provided to properly position pawl 194 adjacent ratchet 196 when roller 92 is in operative position and to properly separate pawl 194 from ratchet 196 when lower roller 92 is in inoperative position. A finger 187, suitably attached to tie link 160 abuts against a portion of pawl 184 when tie link 160 moves to the right and thereby disengages pawl 184 from notch 186 of drive arm 162. Drive arm 162 is now free for clockwise rotation and, by reason of the action of springs 52, the pressure exerted between easel 44 and sac 70 is restored.

In the illustrated embodiment, one of rollers 92 and 96 is mounted on base 20 and the other may be mounted on cover 22. When cover 22 has been pivoted out of operative juxtaposition with base 20, and since rollers 92 and 96 are separated by an appreciable distance, the package of Fig. 6 may be placed easily in proper operating position with sheet 114 contacting subject matter on easel 44, with sheet 118 in passage 99, and with leader 111 extending between rollers 92 and 96. In many instances, the subject matter is oversize or, in other words, is too large to fit into the container formed by base 20 and cover 22. By detaching cover 22 from base 20 and by placing cover 22 upon a photosensitive sheet 114 which has been positioned on a specified portion of such an oversize object, it is possible to properly expose the photosensitive sheet. If a series of oversize objects are to be copied, it is inexpedient first to remove cover 22 from base 20 in order to expose the photosensitive sheet and then to return cover 22 to juxtaposition with base 20 in order to operatively superpose roller 96 on roller 92. Accordingly, novel selective means are provided for mounting roller 92 on cover 22 when the copying device is in normal operation or for mounting roller 96 on base 20 when cover 22 is separated from base 20. When roller 96 is mounted on base 20, there are provided an exposure means which includes, as an element, cover 22, and a completely independent processing means which includes, as an element, base 20. In the form thereof as shown, the selective means comprises the aforementioned U-shaped member 97 which is mounted on base 20 and a U-shaped member 230 which is mounted on cover 22.

Figures 12, 13, 14:
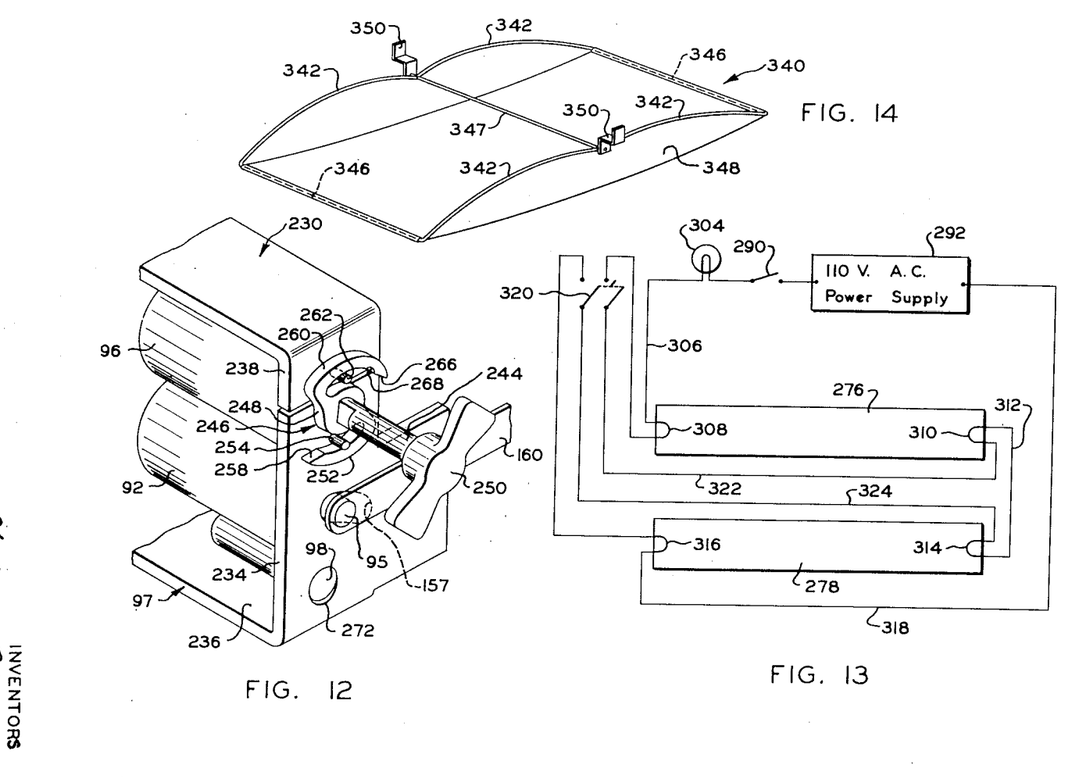
Fig. 12 is a perspective view of another embodiment of the copying device, parts thereof being broken away and parts thereof being omitted.
Fig. 13 is a diagram of an illuminating means and an electrical circuit associated therewith that are included in the copying device.
Fig. 14 is a perspective view of an accessory for the illustrated device.

Viewing Figs. 11 and 12, member 97 is provided with a bight 232, suitably connected to sheet metal floor 101, and the upwardly extending legs 234. Member 230 is provided with a bight 236 and the downwardly extending legs 238. Bight 236 is suitably connected to a mounting bar 237 (Figs. 4 and 11) which is suitably affixed to side walls 30 of cover 22. The free extremities of upwardly extending legs 234 are provided with notches 240 and the free extremities of downwardly extending legs 238 are provided with lugs 242. A shaft 244, on which roller 96 is rotatable, has end portions which may be seated either in notches 240 or on lugs 242. A pair of spring latches, generally designated by 246, which are secured at opposite ends of shaft 244, are adapted to selectively secure the ends of shaft 244 either in notches 240 or on lugs 242. Alternatively, when cover 22 and base 20 are operatively juxtaposed, the ends of shaft 244 may be seated both in notches 240 and on lugs 242 and may be secured in this position by latches 246. In this circumstance, latches 246 additionally act to lock cover 22 and base 20 in operative juxtaposition.

Since both latches 246 are similar in structure, only one is shown in detail in Fig. 12. Latches 246 each comprise a shank 248, which is keyed or otherwise secured to an end of shaft 244 and which is provided with a pair of outwardly extending spring arms 252 and 260. An operating handle 250 is suitably secured to an end of shaft 244 to enable rotation of latch 246. Attached to upwardly extending legs 234 are pins 254 which arms 252 are adapted to grasp in order to secure the ends of shaft 244 in notches 240. Attached to downwardly extending legs 238 are pins 262 which arms 260 are adapted to grasp in order to secure the ends of shaft 244 on lugs 242. The extremities of arms 252 and 260 are beveled, as at 258 and 266, respectively, to facilitate initial engagement of the arms with their respective pins. It will be noted that arm 260 is longer than arm 252 and that arm 260 is provided with a notch 268 which is adapted to coact with pin 262.

If shaft 244 is rotated in a counterclockwise direction to the position at which pin 262 snaps into notch 268, the free end of arm 252 is clear of pin 254. Therefore, cover 22 may be pivoted upwardly to lift roller 96 out of operative superposition with roller 92. When cover 22 and base 20 are operatively juxtaposed, notches 240 are aligned with lugs 242 and the ends of shaft 244 may be seated both in notches 240 and on lugs 242. Cover 22 and base 20 may be locked in this position by clockwise rotation of latches 246 whereby, simultaneously, arms 252 grasp pins 254 and arms 260 grasp pins 262. If handle 250 is rotated in a counterclockwise direction until the extremity of arm 260 is clear of pin 262, shaft 244 will be locked neither to member 97 nor to member 230. Cover 22 now may be pivoted out of operative juxtaposition with base 20 and may be disengaged completely from base 20 by sliding stub shafts 32 and 34 out of bushings 40 and 42, respectively. In order to secure roller 96 in operative position at the ends of legs 234, handle 250 now may be rotated in a clockwise direction so that arms 252 grasp pins 254.

When rollers 92 and 96 are in operative superposition, the distance between their adjacent surfaces is slightly greater than the combined thicknesses of sheets 114 and 118. It is desired to position leader 111 between the rollers and then to advance the remainder of the package of Fig. 6 between the rollers in order to superpose sheets 114 and 118 with a uniformly thin layer of processing composition therebetween. In practice, that portion of the package in the vicinity of pod 122 is greater in thickness than the distance between the adjacent surfaces of rollers 92 and 96. Accordingly, means are provided to enable rollers 92 and 96 to separate when that portion of the package in the vicinity of pod 122 passes therebetween. In the illustrated embodiment, arcuate slots 157 receive shaft 95 with an appreciable amount of transverse clearance to permit slight movement of roller 92 with respect to roller 96 when the rollers are operatively superposed. The lower portions of legs 234 are provided with bores 272, in which are received the ends of axle 98. Bores 272, one of which is shown in Fig. 12, have vertical diameters which are greater than their horizontal diameters and greater than the diameter of axle 98. Axle 98 normally is urged into engagement with the tops of bores 272 by such means as the cradles 273. Each cradle 273, in the form shown, is secured adjacent an end of axle 98 to floor 101 and is urged upwardly by the helical springs 274 (Fig. 7).

A preferred illumination means and a control means associated therewith are shown diagrammatically in Fig. 13. The various elements shown in Fig. 13 are referred to by the same numerals which designate them in the remainder of the drawings. The illustrated illumination means, generally designated by 72, comprises a pair of fluorescent tubes 276 and 278 and suitable means for mounting them adjacent top wall 28 of cover 22.

The illustrated control means comprises a line switch 290, the mechanical construction of which is shown in Fig. 4 and the operation of which will be described in detail below. An alternating current power supply is designated by 292 and is mechanically represented in Fig. 4 by a jack and cord. In operation, tubes 276 and 278 are included in a series circuit which comprises a ballast 304, a lead 306, an electrode 308, an electrode 310, a lead 312, an electrode 314, an electrode 316 and a lead 318. Since the voltage normally impressed across tubes 276 and 278 is insufficient to cause a breakdown of the gas therewithin, a starter switch 320, mechanically shown in Fig. 1, is provided for temporarily connecting a lead 322 across electrodes 308 and 310 and for temporarily connecting a lead 324 across electrodes 314 and 316. When starter switch 320 is depressed, thermionic emission from electrodes 308, 310, 314 and 316 is produced and flow of current through tubes 276 and 278 is initiated. Ballast 304 is adapted to regulate the flow of current through tubes 276 and 278 in the well known manner.

Line switch 290 is shown mechanically in Fig. 4 as being attached to side wall 30 of cover 22. As above shown, mounting means 78 is capable of slight movement inwardly and outwardly with respect to cover 22. Preferably, mounting means 78 is provided with a horizontally extending lug 326. Switch 290 is provided with a follower pin 328 which is adapted to ride against lug 326 and thereby to open and close the circuit diagrammatically shown in Fig. 13 in response to the position of mounting means 78 with respect to cover 22. If cover 22 is in operative juxtaposition with base 20 and pressure is being exerted on sac 70 by easel 44, mounting means 78 and lug 326 are urged inwardly with respect to cover 22. Switch 290 is arranged to be closed when pin 328 is in its innermost position. When switch 290 is closed, starter switch 320 may be pressed by an operator to illuminate tubes 276 and 278. If operating handle 156 is depressed, the pressure exerted between easel 44 and sac 70 is relieved whereby mounting means 78 and lug 326 drop outwardly with respect to cover 22. Switch 290 is arranged to be open when pin 328 is in its outermost position. Thus, when operating handle 156 is depressed, the power to tubes 276 and 278 is cut off.

Means may be provided for indicating whether or not tubes 276 and 278 are illuminated. As shown, this means comprises a ruby glass 330, which is mounted in top wall 28, and which is adapted to transmit light emanating from tubes 276 and 278. When the tubes are on, glass 330 is illuminated.

As a means for indicating the end of a predetermined exposure time, a timer, of conventional design and shown in outline at 331 in Fig. 4, may be provided. Timer 331 may be operatively connected to starter switch 320, so that when switch 320 is pressed, timer 331 is actuated. Timer 331 may include such means as a buzzer which is adapted to produce an audible signal at a predetermined time after switch 320 is pressed. A knob 332, a pointer 334 and a scale 336 calibrated in seconds (Fig. 1) may be provided to enable adjustment of timer 331.

In the operation of the illustrated copying device, assume that initially cover 22 is in juxtaposition with base 20 with lower roller 92 in inoperative position and with easel 44 in its outermost position with respect to base 20. In order most easily to place subject matter on easel 44 and to load the device with the package of Fig. 6, upper roller 96 is secured to cover 22 by rotating handle 250 to the position at which pins 252 snap into notches 268 and cover 22 is pivoted out of juxtaposition with base 20. Subject matter is placed on easel 44. The package of Fig. 6 is placed in proper position with photosensitive sheet 114 on the subject matter, with sheet 118 in passage 99, and with leader 111 extending over lower roller 92 and beyond the edge of base 20. Now, cover 22 is pivoted into operative juxtaposition with base 20 whereby upper roller 96 is carried into operative position at the ends of upstanding legs 234. Cover 22 may be locked in operative juxtaposition with base 20 by clockwise rotation of handle 250 and consequent engagement of arms 252 with pins 254. At this point, springs 52 urge easel 44 toward sac 70 whereby photosensitive sheet 114 is held in intimate contact with the subject matter on easel 44. At this point, also, mounting means 78 has been urged to its extreme inward position, with respect to cover 22, and acts through lug 326 and follower pin 328 to hold switch 290 closed.

Starter switch 320 now may be actuated to energize tubes 276 and 278 and thereby to expose photosensitive sheet 114 to the subject matter with which it is in contact. A visible indication that tubes 276 and 278 are illuminated is given by glass 330. At the completion of a predetermined exposure time, the length of which may be manually adjusted by knob 332, pointer 334 and scale 336, an audible signal is produced by buzzer 331.

Now handle 156 may be depressed normally in order to relieve the pressure exerted between easel 44 and sac 70 and to rotate lower roller 92 about axle 98 into operative position. When the pressure exerted between easel 44 and sac 70 is relieved, mounting means 78 drops to its extreme outward position with respect to cover 22 and acts through lug 326 and follower pin 328 to open switch 290 and to deenergize tubes 276 and 278.

An operator, now, may grasp leader 111 and may draw sheets 114 and 118 between rollers 92 and 96, both of which are in operative position. As pod 122 is advanced between the rollers, the hydraulic pressure therein is increased to the point at which processing composition is ejected from mouth 128. As sheets 114 and 118 are advanced between the rollers, this processing composition is spread between the sheets in a uniformly thin layer. At the end of a predetermined processing time, during which a positive image has been formed on sheet 118, sheets 114 and 118 are peeled apart and sheet 118 is separated from the remainder of the package.

Assume now that the subject matter to be copied is too large to fit into the container formed by base 20 and cover 22. Assume also that, initially, cover 22 is in juxtaposition with base 20 with lower roller 92 in inoperative position and with easel 44 in its outermost position with respect to base 20. It is desired to mount upper roller 96 on base 20 and to separate cover 22 from base 20 in order to provide an exposure means which includes, as an element, cover 22 and a completely independent processing means which includes, as an element, base 20. Upper roller 96 may be mounted in operative position at the ends of upstanding legs 234 by rotating handle 250 in a counterclockwise direction until the extremity of arm 262 is clear of pin 262. At this point, the ends of shaft 244 are positively locked neither in notches 240 nor on lugs 242. If cover 22 now is pivoted out of juxtaposition with base 20, the ends of shaft 244 will remain at rest in notches 240. Cover 22 may be separated completely from base 20 by sliding stub shafts 32 and 34 out of bushings 40 and 42, respectively. Handle 250 may be rotated in a clockwise direction so that arms 252 grasp pins 254 to secure roller 96 in operative position at the ends of upstanding legs 234. The separation of the exposure means and the processing means now is complete.

In order to copy a portion of oversize subject matter, the subject matter first is placed on a table or other supporting surface. Photosensitive sheet 114 is placed upon that portion of the subject matter which it is desired to copy. The cover 22 is positioned upon sheet 114 so that sac 70 presses sheet 114 into intimate contact with the subject matter. Tubes 276 and 278 may be energized in the above-described manner in order to properly expose sheet 114.

Now sheet 114 may be removed from between cover 22 and the subject matter and may be positioned on base 20 for development. If, as was assumed above, roller 96 is operatively mounted at the ends of upstanding legs 234 and roller 92 is in its inoperative or extreme clockwise position, an appreciable distance exists between the adjacent surfaces of rollers 92 and 96. The distance is great enough to permit leader 111 to be threaded between rollers 92 and 96. When leader 111 has been extended in this manner between the rollers, handle 156 then is depressed in order to force roller 92 into operative position. An operator now may grasp leader 111 and may draw sheets 114 and 118 between rollers 92 and 96 in order to superpose sheets 114 and 118 with a thin layer of processing composition therebetween.

The illustrated device may be provided with an accessory that is especially designed for effectively holding a photosensitive sheet against the two uncovered pages of an open book. One such holding means is designated generally by 340 in Fig. 14. As illustrated, holding means 340 comprises a resilient frame having side members 342, end members 346 and a central member 347. A transparent or translucent resilient sheet 348 is suitably attached at its opposite ends to members 346. When central member 347 is aligned with the junction between the uncovered pages, sheet 348 is adapted to press a photosensitive sheet into intimate contact with the pages. Such means as clamps 350 are provided to secure holding means 340 to a source of illumination, such as cover 22. In the form shown, clamps 350 are adapted to clamp against the outer faces of side wall 30 in order to secure the holding means underneath cover 22.

The operation of the exposure means which comprises cover 22 and holding means 340 is similar to the operation of cover 22, by itself, when the cover 22 has been separated from base 20. In order to close line switch 290, however, a shim composed of any suitable material may be inserted between flange 326 and follower 328.

A number of modifications of the herein disclosed copying device are feasible within the scope of the invention. In particular, although the film package of Fig. 6 may be used to particular advantage, modifications thereof are contemplated. In one such modification, either the photosensitive or the other sheet may be continuously supplied from such means as a roll. Alternatively, both sheets may be supplied from rolls. Furthermore, it is to be expressly understood that the invention herein disclosed is not limited to use in a device for copying subject matter but is applicable to numerous other types of photographic apparatus and processing apparatus.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic device for copying subject matter, said device comprising a pair of members movable with respect to each other, said members, when operative, being adapted to exert compressional forces therebetween to hold a photosensitive sheet in superposition with subject matter to be copied and, when inoperative, being separated to permit advancement of said photosensitive sheet with respect to said subject matter, pressure-applying means, when operative, for processing said photosensitive sheet by superposing said photosensitive sheet on another sheet and spreading a processing composition between said sheets and, when inoperative, being separated to permit said sheets to be advanced therebetween in the absence of said compressional forces, and interlocking means for rendering either said pair of members or said pressure-applying means operative when the other is inoperative.

2. A photographic device for copying subject matter, said device comprising a first pair of members movable with respect to each other, said members, when operative, being adapted to exert compressional forces therebetween to hold a photosensitive sheet in superposition with subject matter to be copied and, when inoperative, being separated to permit advancement of said photosensitive sheet with respect to said subject matter in the absence of said compressional forces, a second pair of members, when operative for exerting compressional forces, in order to process said photosensitive sheet by superposing said photosensitive sheet on another sheet and spreading a processing composition between said sheets and, when inoperative, being separated to permit said sheets to be advanced freely therebetween in the absence of said compressional forces, said second pair of members being positioned closely adjacent an edge of at least one of said first pair of members, and interlocking means, including a linkage connected between one of said first pair of members and one of said second pair of members, for rendering either said first pair of members or said second pair of pressure-applying members operative when the other is inoperative.

3. A photographic device for copying subject matter, said device comprising a first mounting means, a second mounting means, means for constraining movement of said second mounting means into and out of operative juxtaposition with said first mounting means, an easel mounted on said first mounting means for supporting subject matter to be copied, holding means mounted on said second mounting means, said easel, when operative, exerting pressure on said holding means and, when inoperative, being prevented from exerting said pressure, spring means for causing said easel to exert said pressure when said first and second mounting means are in operative juxtaposition, a pair of pressure-applying members, one of said pressure-applying members, when operative, being urged toward the other of said pressure-applying members in order to process said photosensitive sheet by superposing said photosensitive sheet on a second sheet and spreading a processing composition between said sheets and, when inoperative, being prevented from exerting pressure on said other of said pressure-applying members, spring means for causing said one of said rollers to exert said pressure on said other of said pressure-applying members, and means for rendering said easel operative when said one of said rollers is inoperative and said one of said rollers operative when said easel is inoperative.

4. A photographic device for copying subject matter, said device comprising a base, a cover pivoted to said base for movement into and out of operative juxtaposition with said base, said base and said cover defining a lighttight compartment when in operative juxtaposition, an easel mounted on said base for supporting subject matter to be copied, holding means mounted on said cover, said easel, when operative, exerting pressure on said holding means and, when inoperative, being prevented from exerting said pressure, a pair of pressure-applying rollers rotatably mounted on at least one of said base and said cover adjacent said easel, one of said pressure-applying rollers, when operative, being urged toward the other of said pressure-applying rollers in order to process said photosensitive sheet by superposing said photosensitive sheet on a second sheet and by spreading a processing composition between said sheets and, when inoperative, being prevented from exerting pressure on said other of said rollers, and a linkage connected between said easel and one of said rollers for rendering said easel operative when said one of said rollers is inoperative and said one of said rollers operative when said easel is inoperative.

5. A photographic device for copying subject matter, said device comprising a first mounting means, a second mounting means, means for constraining movement of said second mounting means into and out of operative juxtaposition with said first mounting means, an easel mounted on said first mounting means for supporting subject matter to be copied, holding means mounted on said second mounting means for holding a photosensitive sheet in contact with said easel, resilient means for causing pressure to be exerted between said easel and said holding means when said first and second mounting means are in operative juxtaposition, means providing a passage for receiving another sheet, a mouth of said passage being adjacent one edge of said easel, and a pair of pressure-applying members adjacent said easel for processing said photosensitive sheet and said other sheet by superposing said photosensitive sheet on said other sheet and passing a processing composition between said sheets, said mouth and said pair of pressure-applying members being adjacent one edge of said easel, said means for constraining movement being adjacent the edge of said easel opposite said one edge.

6. A photographic device for copying subject matter, said device comprising a first mounting means, a second mounting means, means for constraining movement of said second mounting means into and out of operative juxtaposition with said first mounting means, an easel mounted on said first mounting means for supporting subject matter to be copied, said easel being mounted for movement in a first pair of opposite directions with respect to said first mounting means, means for stopping movement of said easel at predetermined positions with respect to said first mounting means, holding means mounted on said second mounting means for holding a photosensitive sheet in contact with said easel, one of said first pair of opposite directions being toward said holding means when said first and second mounting means are in operative juxtaposition, resilient means for urging said easel in said one of said first pair of opposite directions, a pair of pressure-applying members adjacent an edge of said easel, one of said pressure-applying members being mounted for movement in a second pair of opposite directions with respect to the other of said pressure-applying members, one of said second pair of opposite directions being generally toward the other of said members and the other of said second pair of opposite directions being generally away from said other of said members, and means for simultaneously directing said one of said members in said one of said second pair of opposite directions in order to process said photosensitive sheet by superposing said photosensitive sheet on another sheet and passing a processing composition between said sheets and said easel in the other of said first pair of opposite directions and for simultaneously directing one of said members in said one of said second pair of opposite directions and said easel in said one of said first pair of opposite directions.

7. The photographic device of claim 6 comprising an illumination means carried by said second mounting means for exposing said photosensitive sheet to said subject matter, and switch means responsive to movement of said easel in said other of said first pair of opposite directions to deenergize said illumination means.

8. A photographic device for copying subject matter, said device comprising a first mounting means, a second mounting means, means for constraining movement of said second mounting means into and out of operative juxtaposition with said first mounting means, an easel mounted on said first mounting means for supporting subject matter to be copied, said easel being mounted for movement in opposite directions with respect to said first mounting means, means for stopping movement of said easel at predetermined positions with respect to said first mounting means, holding means mounted on said second mounting means for holding a photosensitive sheet in contact with subject matter mounted on said easel, one of said opposite directions being toward said holding means when said first mounting means and said second mounting means are in operative juxtaposition, resilient means operative to urge said easel in said one of said opposite directions in order to apply pressure between said easel and said holding means, first control means for moving said easel in the other of said opposite directions in order to render said resilient means inoperative, a pair of pressure-applying members associated with said first and second mounting means, second control means, when operative, for moving said pressure-applying members into operative positions a relatively small distance from each other and, when inoperative, for moving said pressure-applying members into inoperative positions a relatively great distance from each other, and means for interconnecting said first and second control means.

9. The photographic device of claim 8 wherein said means for constraining movement of said second mounting means into and out of operative juxtaposition with said first mounting means comprises a first pivot means secured to said first mounting means and a second pivot means secured to said second mounting means, said first and second pivot means being adapted to be engaged to pivotally connect said first and second mounting means and being adapted to be disengaged to enable positioning of said second mounting means on any portion of oversize subject matter that it is desired to copy, said pressure-applying members and said first and second pivot means being at opposite edges of said easel.

10. The photographic device of claim 8 wherein said first control means comprises at least one track secured to said easel and a shaft rotatably mounted on said first mounting means, said shaft having a crank portion operatively connected to said track, whereby opposite rotational movement of said shaft causes movement of said easel with respect to said first mounting means in said opposite directions.

11. The photographic device of claim 8 wherein said second control means comprises an axle pivotally mounted on said first mounting means, a pair of links secured to said axle, one of said pressure-applying members being mounted on said links for pivotal movement into and out of operative position.

12. The photographic device of claim 8 wherein said means for interconnecting said first and second control means comprises a link which is operatively connected at one end to said first control means and which is operatively connected at the other end to said second control means, said link acting to urge said one pressure-applying member into inoperative position when said resilient means is operative and acting to urge said one pressure-applying member into operative position when said resilient means is inoperative.

13. The photographic device of claim 8 wherein each of said pressure-applying members comprises a rotatable roller.

14. A photographic device for copying subject matter, said device comprising a first mounting means, a second mounting means, means for constraining movement of said second mounting means into and out of operative juxtaposition with said first mounting means, an easel mounted on said first mounting means for supporting subject matter to be copied, said easel being mounted for movement in opposite directions with respect to said first mounting means, holding means mounted on said second mounting means for holding a photosensitive sheet in contact with subject matter supported on said easel, one of said opposite directions being toward said holding means when said first mounting means and said second mounting means are in operative juxtaposition, means on said first mounting means providing a passage for receiving another sheet, a mouth of said passage being adjacent one edge of said easel, resilient means mounted on said first mounting means, said resilient means acting to urge said easel in said one direction, said holding means acting to exert pressure on said easel to force said easel in the other of said opposite directions when said second mounting means is in operative juxtaposition with said first mounting means, a pair of pressure-applying members adjacent said one edge of said easel for superposing said photosensitive sheet on said other sheet and for passing a thin layer of processing composition between said sheets, said pressure-applying members being in operative juxtaposition when actuated and being out of operative juxtaposition when deactuated, manually operable means for relieving the exertion of pressure between said easel and said holding means and for actuating said pressure-applying members, and automatic means for restoring the exertion of pressure between said easel and said holding means and for deactuating said pressure-applying members, said automatic means being responsive to a feeler which is adapted to slide along an edge of a sheet positioned in said passage and which is adapted to actuate said automatic means when it drops beyond the end of a sheet being drawn from said passage.

15. A photographic device comprising a first mounting means, a second mounting means adapted to be operatively juxtaposed with said first mounting means, means associated with said first and second mounting means for positioning a photosensitive sheet for exposure when said first and second mounting means are in operative juxtaposition, and pressure-applying means comprising a first pair of legs mounted on said first mounting means, a first pressure-applying member operatively secured to said pair of legs, a second pair of legs mounted on said second mounting means, and a second pressure-applying member mounted on a shaft, the extremities of said shaft being adapted to be seated either at the free extremities of the first pair of legs or at the free extremities of the second pair of legs when said first and second mounting means are out of operative juxtaposition, the extremities of said shaft being adapted to be seated both on the free extremities of the first pair of legs and on the free extremities of the second pair of legs when said second mounting means is in operative juxtaposition with said first mounting means, and latch means mounted on said shaft for selectively latching the extremities of said shaft to the free extremity of either or both of said first pair of legs and said second pair of legs, said first pressure-applying member and said second pressure-applying member, when the extremities of said shaft are seated at least on the free extremities of said first pair of legs, exerting pressure therebetween whereby a processing composition may be spread between said photosensitive sheet and another sheet advanced between said first pressure-applying member and said second pressure-applying member.

16. A photographic device comprising a first mounting means, a second mounting means, means for constraining movement of said second mounting means into and out of operative juxtaposition with said first mounting means, means associated with said first and second mounting means for positioning a photosensitive sheet for exposure, pressure-applying means comprising a first pair of legs mounted on said first mounting means, a first pressure-applying member operatively secured to said pair of legs, a second pair of legs mounted on said second mounting means, a second pressure-applying member mounted on a shaft, the extremities of said shaft being adapted to be seated either at the free extremities of the first pair of legs or at the free extremities of the second pair of legs when said first and second mounting means are out of operative juxtaposition, the extremities of said shaft being adapted to be seated both on the free extremities of the first pair of legs and on the free extremities of the second pair of legs when said second mounting means is in operative juxtaposition with said first mounting means, and latch means mounted on said shaft for selectively latching the extremities of said shaft to the free extremities of either or both of said first pair of legs and said second pair of legs, said first pressure-applying member and said second pressure-applying member, when the extremities of said shaft are seated at least on the free extremities of said first pair of legs, exerting pressure therebetween whereby a processing composition may be spread between said photosensitive sheet and another sheet advanced between said first pressure-applying member and said second pressure-applying member.

17. A photographic device for copying subject matter, said device comprising a first mounting means, a second mounting means, detachable constraining means for connecting said first mounting means and said second mounting means, illuminating means on said second mounting means, said first and second mounting means, by virtue of said detachable constraining means, being movable with respect to each other into predetermined relative positions and being detachable from each other, clamping means associated with said first mounting means and said second mounting means, said clamping means when operative being adapted to position a photosensitive sheet for exposure to subject matter to be copied and when inoperative being adapted to permit relative movement of said photosensitive sheet with respect to said clamping means, a pair of pressure-applying members, means for securing one of said pressure-applying members to said first mounting means, selective means for securing the other of said pressure-applying members to at least one of said first mounting means and said second mounting means, said pair of pressure-applying members when operative being adapted to exert compressional forces whereby a processing composition may be spread between said photosensitive sheet and another sheet advanced in superposed relation therebetween, said pair of pressure-applying members when inoperative being spaced from each other to permit threading of said photosensitive sheet and said other sheet therebetween, and interlocking means for rendering either said clamping means or said pair of pressure-applying members operative when the other is inoperative, said second mounting means when detached from said first mounting means being capable of exposing said photosensitive sheet to oversize subject matter, said first mounting means when said other pressure-applying member is secured thereto and said second mounting means is so detached being capable of processing said photosensitive sheet.

18. A photographic device for copying subject matter, said device comprising a first mounting means, a second mounting means, detachable pivot means for connecting said first mounting means and said second mounting means, said first and said second mounting means, by virtue of said detachable pivot means, being movable with respect to each other into predetermined relative positions and being detachable from each other, an illumination means on said second mounting means, clamping means associated with said first mounting means and said second mounting means, said clamping means when operative being adapted to position a photosensitive sheet for exposure to subject matter to be copied and when inoperative being adapted to permit relative movement of said photosensitive sheet with respect to said clamping means, a pair of pressure-applying rollers, means for securing one of said rollers to said first mounting means, selective means for securing the other of said rollers to at least one of said first and second mounting means, said rollers when operative being adapted to exert compressional forces whereby a processing composition may be spread between said photosensitive sheet and another sheet advanced in superposed relation between said rollers, said rollers when inoperative being spaced from each other to permit the threading of said photosensitive sheet and said other sheet therebetween, and interlocking means for rendering either said clamping means or said rollers operative when the other is inoperative, said second mounting means when detached from said first mounting means being adapted to expose a photosensitive sheet to oversize subject matter to be copied, said first mounting means when said other roller is secured thereto and said second mounting means is so detached being capable of processing a photosensitive sheet exposed to said oversize subject matter.

References Cited in the file of this patent

UNITED STATES PATENTS

| Number | Name | Date |
|---|---|---|
| 849,184 | Auld | Apr. 2, 1907 |
| 1,711,333 | Swenson | Apr. 30, 1929 |
| 2,344,405 | Grover | Mar. 14, 1944 |